UNITED STATES PATENT OFFICE 2,615,037

O,O-DI(4-CHLOROPHENYL) N-ALKYL-AMIDOTHIOPHOSPHATES

Clarence L. Moyle, Clare, Mich., assignor to The Dow Chemical Company, Midland, Mich., a corporation of Delaware No Drawing. Application October 15, 1948, Serial No. 54,832

6 Claims. (Cl. 260—461)

This invention is directed to O,O-di(4-chlorophenyl) N-alkylamidothiophosphates having the formula

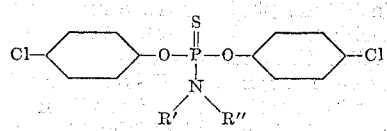

wherein R' represents an alkyl radical and R'' represents hydrogen or an alkyl radical.

These new products are oils or low-melting solids, somewhat soluble in many organic solvents, substantially insoluble in water, stable to light and air, not appreciably affected by carbon dioxide and non-corrosive to the skin of man and higher animals. They are valuable as modifiers in plastic compositions, as constituents of extreme pressure lubricants, as intermediates for the preparation of more complex organic derivatives, and as constituents of insecticide and fungicide compositions.

The new amidothiophosphates may be prepared by reacting an alkali metal 4-chlorophenolate with an N-alkyl dichlorothiophosphoramide having the formula

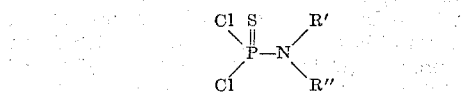

wherein R' represents an alkyl radical and R'' represents hydrogen or an alkyl radical. In carrying out the reaction, a solution of the chlorophenolate, preferably the sodium or potassium salt, is prepared by reacting 2 molecular proportions of sodium or potassium hydroxide with 2 molecular proportions of the chlorophenol in an inert organic solvent, e. g. benzene, ethyl alcohol or methyl alcohol. 1 molecular proportion of an N-alkyl dichlorothiophosphoramide is then added portionwise to the phenolate dispersion. The reaction is exothermic, and has been found to take place at a temperature between 30° and 110° C. The temperature is controlled by regulation of the rate of addition of the N-alkyl dichlorothiophosphoramide and by the addition and subtraction of heat, if required. In an alternative procedure, the phenolate is added portionwise to the N-alkyl dichlorothiophosphoramide.

Following the reaction, the crude mixture may be washed with water and the amidothiophosphate product separated by extracting with a non-reactive water-immiscible organic solvent, such as diethyl ether, methylene dichloride or benzene. The extract is successively washed with dilute aqueous sodium or ammonium hydroxide, and dried with anhydrous sodium sulphate. The desired product is then separated by evaporation of the solvent.

The N-alkyl dichlorothiophosphoramides employed as starting materials may be prepared by reacting a hydrochloride of a mono- or dialkyl amine with an excess of thiophosphoryl chloride ($PSCl_3$). Good yields are obtained in preparations employing from 2 to 4 molecular proportions of thiophosphoryl chloride per molecular proportion of the amine salt. The reaction is carried out at the boiling temperature of the reaction mixture and is accompanied by the evolution of hydrogen chloride. Following the reaction, the mixture is fractionally distilled under reduced pressure to obtain the N-substituted dichlorothiophosphoramide.

*Example 1.—O,O-di(4-chlorophenyl) N-methylamidothiophosphate*

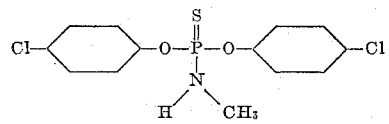

10 grams (0.07 mol) of 4-chlorophenol was reacted with 3.9 grams (0.07 mol) of potassium hydroxide in 40 grams of methyl alcohol to form a solution of the phenolate. 5.75 grams (0.035 mol) of N-methyl dichlorothiophosphoramide was added to the above product and the resulting mixture warmed for 5 minutes at 50° C. to complete the reaction. The crude mixture was then washed with water and the organic products of reaction extracted with methylene dichloride. This solvent solution was successively washed with dilute aqueous ammonium hydroxide and water, and dried. The solvent was then removed by evaporation to obtain an O,O-di(4-chlorophenyl) N-methylamidothiophosphate product as a colorless oil having a density of 1.26 at 26° C. and a refractive index $n/D$ of 1.5356 at 35° C.

*Example 2.—O,O-di(4-chlorophenyl) N-ethylamidothiophosphate*

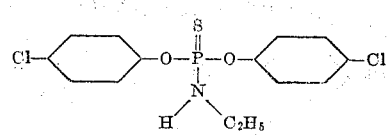

25.7 grams (0.2 mol) of 4-chlorophenol and 11.2 grams (0.2 mol) of potassium hydroxide were reacted in 79.8 grams of methyl alcohol. 17.8 grams (0.1 mol) of N-ethyl dichlorothiophosphoramide was added portionwise to the above phenolate solution with stirring and cooling to 25° to 30° C. The crude mixture was washed with water, the organic products of reaction extracted with diethyl ether and the extract washed with dilute aqueous ammonium hydroxide and water, and dried. The solvent was then removed by evaporation to obtain an O,O-di(4-chlorophenyl) N - ethylamidothiophosphate product as a colorless oil having a density of 1.15 at 28° C. and a refractive index n/D of 1.5290 at 35° C.

*Example 3.—O,O-di(4-chlorophenyl) N-isopropylamidothiophosphate*

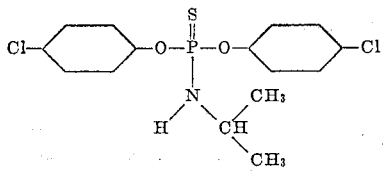

25.7 grams (0.2 mol) of 4-chlorophenol and 11.2 grams (0.2 mol) of potassium hydroxide were reacted together in 79.8 grams of methyl alcohol to form the potassium salt of the phenol. 19.2 grams (0.1 mol) of N-isopropyl dichlorothiophosphoramide was added portionwise to the above product over a period of 5 minutes. The temperature was regulated at 30° to 40° C. during the addition and the resulting mixture subsequently warmed at 50° C. to complete the reaction. The separation was accomplished as described in Example 1 to obtain an O,O-di(4-chlorophenyl) N - isopropylamidothiophosphate product as a colorless oil having a density of 1.13 at 19° C. and a refractive index n/D of 1.5250 at 35° C.

*Example 4.—O,O - di(4 - chlorophenyl) N,N - dimethylamidothiophosphate*

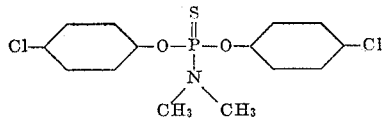

20.6 grams (0.16 mol) of 4-chlorophenol and 9 grams (0.16 mol) of potassium hydroxide were reacted in 40 grams of methyl alcohol. 14.25 grams (0.08 mol) of N,N-dimethyl dichlorothiophosphoramide was added to the above solution and the resulting mixture warmed at 50° C. to complete the reaction. The crude reaction product was then filtered, the methyl alcohol recovered from the filtrate by evaporation, and the residue dispersed in diethyl ether. The resultant mixture was successively washed with dilute aqueous ammonium hydroxide and water, and dried with anhydrous sodium sulphate. The diethyl ether was then removed by evaporation to obtain a O,O-di(4-chlorophenyl) N,N-dimethylamidothiophosphate product as an orange oil having a density of 1.16 at 24° C. and a refractive index n/D of 1.5533 at 35° C.

*Example 5.—O,O-di(4-chlorophenyl) N,N-diethylamidothiophosphate*

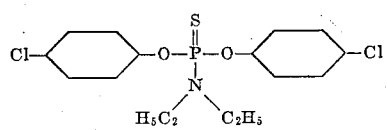

34.7 grams (0.27 mol) of 4-chlorophenol was reacted with 14.6 grams (0.26 mol) of potassium hydroxide in 79.8 grams of methyl alcohol. 26.7 grams (0.13 mol) of N,N-diethyl dichlorothiophosphoramide was added to this phenolate solution and the resulting mixture warmed for 15 minutes at 50° to 55° C. to complete the reaction. The crude mixture was then washed with water and the organic products of reaction extracted with diethyl ether. This extract was washed with dilute aqueous ammonium hydroxide. An emulsion formed and was broken by the addition of a small amount of acetone. The mixture divided into aqueous and solvent layers. The solvent layer was separated, washed with water and dried with anhydrous sodium sulphate. The solvent was then removed by evaporation to obtain an O,O-di(4-chlorophenyl) N,N-diethylamidothiophosphate product having a density of 1.16 at 28° C. and a refractive index n/D of 1.5458 at 35° C.

In a similar manner other O,O-di(4-chlorophenyl) N-alkylamidothiophosphates may be prepared of which the following are representative.

O,O-di(4 - chlorophenyl) N,N - disecondarybutylamidothiophosphate by reacting together sodium 4-chlorophenolate and N,N-disecondarybutyl dichlorothiophosphoramide.

O,O-di(4-chlorophenyl) N - dodecylamidothiophosphate by reacting together sodium 4-chlorophenolate and N-dodecyl dichlorothiophosphoramide.

O,O - di(4 - chlorophenyl) N - normalbutyl-N-normalhexylamidothiophosphate by reacting together sodium 4-chlorophenolate and N-normalbutyl - N - normalhexyl dichlorothiophosphoramide.

O,O-di(4-chlorophenyl) N-normaloctylamidothiophosphate by reacting together sodium 4-chlorophenolate and N-normaloctyl dichlorothiophosphoramide.

The new amidothiophosphate products have been found effective as insecticides and fungicides and are adapted to be employed for the control of agricultural and household pests. In representative operations, the products of the preceding examples have been tested for the control of two-spotted spider mite, bean aphid and Mexican bean beetle. Against these organisms, 100 per cent kills have been obtained with from 0.5 to 3 pounds of toxicant per 100 gallons of spray mixture. By such expression, applicant means that against one or more of the named organisms, complete controls have been obtained with each toxicant when employed in aqueous spray compositions at a concentration of from 0.5 to 3 pounds of toxicant 100 per gallons of spray mixture. Such spray mixtures have contained the new products in combination with representative wetting and emulsifying agents. When employed for the control of American roach nymphs, 100 per cent kills have been obtained in 24 hours by allowing the insects to feed upon white flour containing 1 per cent by weight of many of the toxicants.

I claim:

1. An amidothiophosphate having the formula

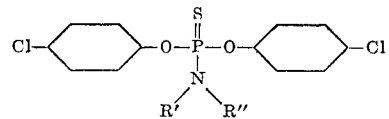

wherein R' represents an alkyl radical and R" represents a member of the group consisting of hydrogen and alkyl radicals.

2. O,O-di(4-chlorophenyl) N,N-diethylamidothiophosphate.

3. O,O-di(4-chlorophenyl) N,N-dimethylamidothiophosphate.

4. O,O - di(4 - chlorophenyl) N,-methylamidothiophosphate.

5. O,O-di(4-chlorophenyl) N-ethylamidothiophosphate.

6. O,O-di(4-chlorophenyl) N-isopropylamidothiophosphate.

CLARENCE L. MOYLE.

REFERENCES CITED

The following references are of record in the file of this patent:

UNITED STATES PATENTS

| Number | Name | Date |
| --- | --- | --- |
| 2,146,584 | Lipkin | Feb. 7, 1939 |
| 2,302,805 | Schussler | Nov. 24, 1942 |

FOREIGN PATENTS

| Number | Country | Date |
| --- | --- | --- |
| 500,386 | Great Britain | Feb. 8, 1939 |

OTHER REFERENCES

Autenrieth et al: "Ber. deutsch. chem. Ges," vol. 31 (1898), pp. 1097–1099.